(12) United States Patent
Mahyari et al.

(10) Patent No.: US 10,967,514 B2
(45) Date of Patent: Apr. 6, 2021

(54) APPARATUS AND METHOD TO MONITOR ROBOT MECHANICAL CONDITION

(71) Applicant: ABB Schweiz AG, Baden (CH)

(72) Inventors: Arash Mahyari, Kissimmee, FL (US); Nevroz Sen, San Jose, CA (US); Thomas Locher, Zürich (CH); Wenzhi Gao, San Jose, CA (US); Dan Dai, San Jose, CA (US); Said Zahrai, Seefeld (DE)

(73) Assignee: ABB Schweiz Ag, Baden (CH)

( * ) Notice: Subject to any disclaimer, the term of this patent is extended or adjusted under 35 U.S.C. 154(b) by 233 days.

(21) Appl. No.: 16/108,992

(22) Filed: Aug. 22, 2018

(65) Prior Publication Data

US 2020/0061833 A1 Feb. 27, 2020

(51) Int. Cl.
*B25J 9/00* (2006.01)
*B25J 9/16* (2006.01)
*G01N 19/08* (2006.01)

(52) U.S. Cl.
CPC ............. *B25J 9/1674* (2013.01); *B25J 9/161* (2013.01); *B25J 9/1694* (2013.01); *G01N 19/08* (2013.01)

(58) Field of Classification Search
CPC ........ B25J 9/1674; B25J 9/1694; B25J 9/161; G01N 19/08; G05B 23/024; G05B 2219/34477; G05B 2219/39412; G05B 13/042
See application file for complete search history.

(56) References Cited

U.S. PATENT DOCUMENTS

| 5,493,192 | A | 2/1996 | Nihei et al. |
| 8,812,157 | B2 * | 8/2014 | Morioka ................ B25J 9/1674 |
| | | | 700/254 |
| 2008/0215292 | A1 | 9/2008 | Kato et al. |
| 2012/0290879 | A1 | 11/2012 | Shibuya et al. |

(Continued)

FOREIGN PATENT DOCUMENTS

| CN | 102785253 | B | 4/2015 |
| DE | 60017723 | T2 | 6/2005 |
| JP | 2732159 | B2 | 3/1998 |

(Continued)

OTHER PUBLICATIONS

European Patent Office, Extended European Search Report in corresponding application No. 19193167.4, dated Apr. 21, 2020, 11 pp.

(Continued)

*Primary Examiner* — Ian Jen
(74) *Attorney, Agent, or Firm* — Taft Stettinius & Hollister LLP

(57) ABSTRACT

Mechanical condition monitoring of robots can be used to detect unexpected failure of robots. Data taken from a robot operation is processed and compared against a health baseline. Features extracted during the monitoring stage of robot operation are aligned with features extracted during the training stage in which the health baseline is established by projecting both onto a common subspace. A classifier which can include a distance assessment such as an L2-norm is used within the common subspace to assess the condition of the robot. Excursions of the distance assessment from a criteria indicate a failure or potential failure.

20 Claims, 6 Drawing Sheets

(56) References Cited

U.S. PATENT DOCUMENTS

2016/0149996 A1* 5/2016 Eckert ................ H04L 67/2842
                                                                      709/217

FOREIGN PATENT DOCUMENTS

| JP | 4741691 B2 | 8/2011 |
| WO | 2015079766 A1 | 6/2015 |

OTHER PUBLICATIONS

X. Hu et al., "Robust Model Selection Decision-making using a Fuzzy Supervisory Approach," 2009 IEEE Symposium on Computational Intelligence in Multi-Criteria Decision-Making (MCDM), dated May 15, 2009, 7 pp., IEEE, Piscataway, USA.

V. Sathish et al., "Event Based Robot Prognostics using Principal Component Analysis," 2014 IEEE International Symposium on Software Reliability Engineering Workshops, dated Dec. 15, 2014, 4 pp., IEEE, Piscataway, USA.

T. Boucher et al., "Aligning Mixed Manifolds," Proceedings of the Twenty-Ninth AAAI Conference on Artificial Intelligence, dated 2015, pp. 2511-2517, Association for the Advancement of Artificial Intelligence, Palo Alto, USA.

* cited by examiner

APPARATUS AND METHOD TO MONITOR ROBOT MECHANICAL CONDITION

TECHNICAL FIELD

The present invention generally relates to condition monitoring, and more particularly, but not exclusively, to operation independent robotic condition monitoring.

BACKGROUND

Current mechanical condition monitoring algorithms are operation-dependent, which requires that a current robotic operation having a set of operational movements (such as those movement(s) associated with a production environment) be the same for comparison purposes as movements of the robotic operation used for establishing a healthy baseline mathematical robot model. Such a requirement for similar movements can impede efficient operation since operational movements of the robot in an ongoing production environment must be ceased (at least when the current robotic operation is not the same as the operation used to establish the baseline) to allow a comparison with the healthy baseline model. If an operator chooses to forgo maintenance monitoring in order to increase uptime, an issue might develop, in the worst case resulting in the breakdown of the robot. Accordingly, there remains a need for further contributions in this area of technology.

SUMMARY

One embodiment of the present invention is a unique condition monitoring device. Other embodiments include apparatuses, systems, devices, hardware, methods, and combinations for monitoring condition of a robot independent of the particular robot operation. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
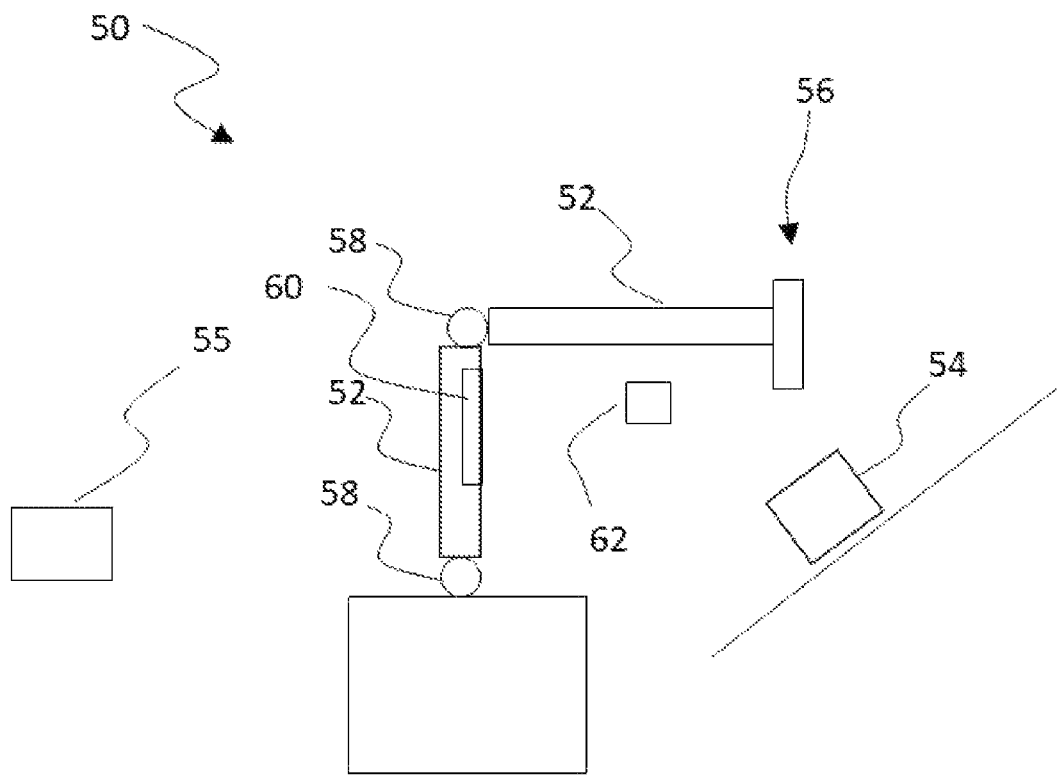
FIG. 1 illustrates one embodiment of a robot.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a schematic of a robot 50 which includes a number of moveable robot components 52 useful for the robot to effect an action. In the illustrated embodiment, the robot 50 is depicted as interacting with a target 54 using an effector 56, but it will be understood that the robot may take on other roles that may or may not involve physical interaction with objects, such as those in which the robot 50 is limited to observations only. The robot 50 can be mounted upon a stationary base as illustrated in FIG. 1, but other forms are also contemplated such as those involving a mobile robot. The robot components 52 can take any variety of forms such as arms, links, beams, etc which can be used to position the effector 56. The robot 50 can include any number of moveable components 52 which can take on different sizes, shapes, and other features. The components 52, furthermore, can be interconnected with one another through any variety of useful mechanisms such as links and/or gears 58, to set forth just two examples. The components 52 can be actuated via any suitable actuation device 60 such as electric actuators, pneumatic or hydraulic pistons, electromechanical actuators, etc. The effector 56 can take any variety of forms such as a gripper, suction effector, belt, etc. As will be appreciated, a sensor 62 can be used to detect an operating condition of the robot 50. Such a sensor 62 can be part of the robot 50, can be coupled with the robot 50, or can be remote from the robot 50. To set forth just a few nonlimiting examples, the sensor 62 can be associated with an actuator 60 useful to enable movement of the robot, such as a current sensor, hydraulic pressure sensor, etc. In additional and/or alternative forms the sensor 62 can be an independent sensor used to detect a position, orientation, operational condition, etc of the robot. For example, a vibration sensor 62 could be used to sense condition of the robot. In still further alternative and/or additional forms, the sensor 62 could be a camera used to detect an electromagnetic condition of the robot 50.

The robot 50 can be coupled to a computing device 55 which can be local to the robot 50, or stationed at a remote location. Such computing device 55 can be used to control, observe, and/or estimate conditions of the robot 50, among other potential uses. Embodiments of the computing device 55 can be used to detect the relative health of the robot 50 as will be described further below. It will be appreciated that embodiments can also be applied to other mechanically moveable devices whether or not of the robotic kind.

Figure 2:
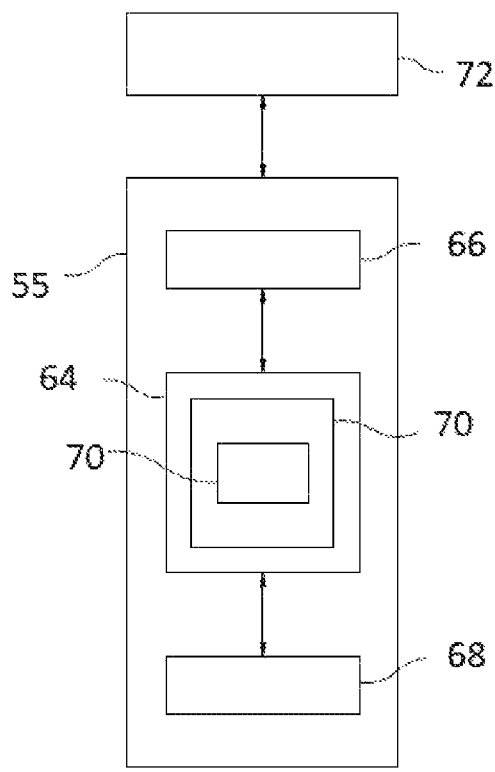
FIG. 2 illustrates an embodiment of a computing device.

Turning now to FIG. 2, and with continued reference to FIG. 1, a schematic diagram is depicted of a computing device 55 useful in controlling, observing, estimating conditions and/or assessing the health of the robot 50. Computing device 55 includes a processing device 64, an input/output device 66, memory 68, and operating logic 70. Furthermore, computing device 55 can be configured to communicate with one or more external devices 72.

The input/output device 66 may be any type of device that allows the computing device 55 to communicate with the external device 72. For example, the input/output device may be a network adapter, RF device, network card, or a port (e.g., a USB port, serial port, parallel port, VGA, DVI, HDMI, FireWire, CAT 5, or any other type of port). The input/output device 66 may be comprised of hardware, software, and/or firmware. It is contemplated that the input/output device 66 includes more than one of these adapters, cards, or ports.

The external device 72 may be any type of device that allows data to be inputted or outputted from the computing device 55. In one non-limiting example the external device 72 is one or more of the sensors 62. To set forth just a few additional non-limiting examples, the external device 72 may be another computing device, a server, a printer, a display, an alarm, an illuminated indicator, a keyboard, a mouse, mouse button, or a touch screen display. Furthermore, it is contemplated that the external device 72 may be integrated into the computing device 55. For example, the computing device 55 may be a smartphone, a laptop computer, or a tablet computer. It is further contemplated that there may be more than one external device in communication with the computing device 55. The external device can be co-located with the computing device 55 or alternatively located remotely from the computer.

Processing device 64 can be of a programmable type, a dedicated, hardwired state machine, or a combination of these; and can further include multiple processors, Arithmetic-Logic Units (ALUs), Central Processing Units (CPUs), or the like. For forms of processing device 64 with multiple processing units, distributed, pipelined, and/or parallel processing can be utilized as appropriate. Processing device 64 may be dedicated to performance of just the operations described herein or may be utilized in one or more additional applications. In the depicted form, processing device 64 is of a programmable variety that executes algorithms and processes data in accordance with operating logic 70 as defined by programming instructions (such as software or firmware) stored in memory 68. Alternatively or additionally, operating logic 70 for processing device 64 is at least partially defined by hardwired logic or other hardware. Processing device 64 can be comprised of one or more components of any type suitable to process the signals received from input/output device 66 or elsewhere, and provide desired output signals. Such components may include digital circuitry, analog circuitry, or a combination of both.

Memory 68 may be of one or more types, such as a solid-state variety, electromagnetic variety, optical variety, or a combination of these forms. Furthermore, memory 68 can be volatile, nonvolatile, or a mixture of these types, and some or all of memory 68 can be of a portable variety, such as a disk, tape, memory stick, cartridge, or the like. In addition, memory 68 can store data that is manipulated by the operating logic 70 of processing device 64, such as data representative of signals received from and/or sent to input/output device 66 in addition to or in lieu of storing programming instructions defining operating logic 70, just to name one example. As shown in FIG. 2, memory 68 may be included with processing device 64 and/or coupled to the processing device 64.

The operating logic 70 can include the algorithms and steps of the controller, whether the controller includes the entire suite of algorithms necessary to effect movement and actions of the robot 50, or whether the computing device 55 includes just those necessary to assess the health of the robot 50. The operating logic can be saved in a memory device whether of the volatile or nonvolatile type, and can be expressed in any suitable type such as but not limited to source code, object code, and machine code.

Figure 3:
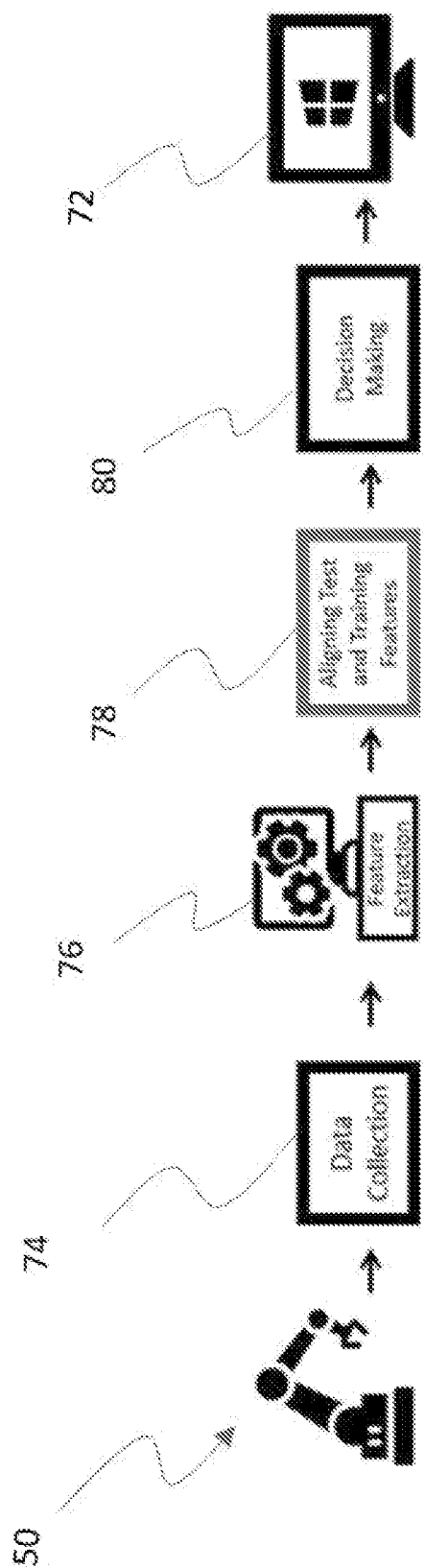
FIG. 3 illustrates a health monitoring assessment approach.
Figure 4:
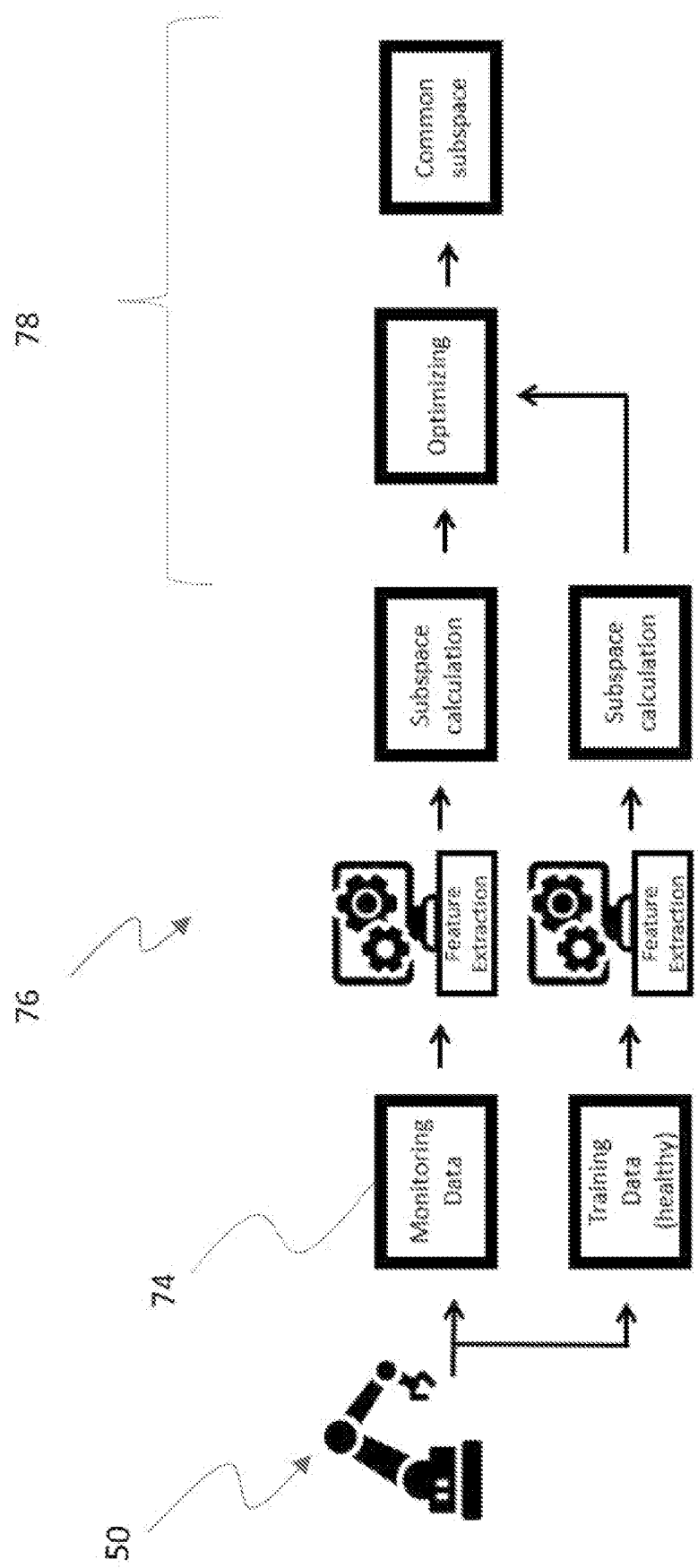
FIG. 4 illustrates a health monitoring assessment approach.

Turning now to FIG. 3, one embodiment of a system useful in detecting a health condition of the robot 50 is illustrated. Monitoring the health of a robot can be important in preventing unexpected robot failures and breakdowns. Monitoring the condition of any of the robot components 52, actuation device 60, sensors 62, and/or interactions of any of these items, assists in determining the overall health of the robot 50. In just one nonlimiting example, monitoring for backlash can be used to assess a health condition of a robot. In order to observe degradations and predict failures, a model can be trained with signals obtained from the robot 50 (or an analogous robot used for that purpose) when the robot is in a healthy or baseline state. The training stage associated with building a model usually consists of data collection 74 (which can include some amount of preprocessing), feature extraction 76, comparison of data 78, and a decision making step 80, which distinguishes between data corresponding to a healthy or abnormal state. One or more computing devices 55 can be used in any of the data collection 74, feature extraction 76, alignment of data 78 in a common environment, comparison of data and decision making 80. As will also be appreciated, sensors 62 can be used to measure relevant details and provide data for the data collection 74.

Once a model has been trained with a healthy/baseline robot dataset (also sometimes referred to as a training dataset), signals obtained from the robot when in later operations can be compared with the trained model, but caution must be exercised. As described herein, a robot can be subjected to a first set of operations characterized by a certain sequence of movement of robot components 52 (and/or robot effectors 56). The robot can also be subjected to a second set of operations characterized by different sequence of movements of the same or different combination of robot components 52 (and/or robot effectors 56). The operations can therefore be the same as the training data, but need not always be the same. If features determined from operation of the robot diverge significantly from features present in the model, the robot might be considered to be in an abnormal state and a future failure can be predicted, but care must be taken to ignore differences due entirely to operation changes and not a change in health. Embodiments described below can be used to assist comparing operational data with health/baseline data of the robot regardless if the operational movements of the robot are the same as the movements used to assess the health/baseline robot. Embodiments described herein introduce a manifold alignment step after the feature extraction 76 and before making the final decision 78.

One technique of extracting relevant features from data collected via the sensor 62 involves the use of principal component analysis. Another technique of extracting features in step 76 prior to manifold alignment employs the use of short-time Fourier transform (STFT) of the robot signals and combinations are used for feature extraction. Reference below to principal component analysis is just an example and is not intended to be limiting, as the STFT approach can also be used to extract features. Thus, mention of the term "feature" herein can refer to features extracted using STFT as well as principal component analysis. As will be appreciated, principal component analysis can be performed on a dataset, whether the data represents raw or calculated data, and/or represents data collected from the sensor that is further processed/calculated and/or used in an estimation routine either by itself or in conjunction with other data. Let $v_1, v_2, \ldots, v_p$ denote the principal components of the features $X \in \mathbb{R}^{N \times P}$ extracted from the training signals. These principal components (vectors) span the subspace, which represents the training data. Now, let $Y \in \mathbb{R}^{N \times P}$ be the features extracted from the test data with the principal components $u_1, u_2, \ldots, u_p$. If X and Y are the features from two different datasets with the same robot operation, $v_1, v_2, \ldots, v_p$ is able to represent X and Y, and Y can be compared with X in this subspace. As a result, divergence of Y from X is the indicator of an anomaly.

If X and Y are features corresponding to two different robot operations, $v_1, v_2, \ldots, v_p$ may not be capable of representing Y. Thus, Y can be detected as an anomaly even though it may be normal behavior. In embodiments of the application herein the subspaces of X and Y are considered two points on a manifold. The assumption is that when the operation changes, the subspace representing the dataset moves on a manifold. In order to compensate for this movement, the features of the two datasets can be aligned before comparison. Manifold alignment is used in the alignment when these datasets are assumed to share a common underlying structure, by embedding each input set into a shared latent manifold space. Techniques described herein find the common subspace between test and training dataset through unsupervised techniques such as manifold alignment, the alignment of which in some embodiments can include solving an optimization problem.

FIG. 3 depicts an embodiment in which an optimization problem is solved to assist in determining a common subspace of the test and training data. Non-limiting techniques of determining a common subspace include Domain Adaptation which can include, to set forth just a few examples, manifold alignment, locally linear embedding (LLE), low-rank embedding (LRE), and low-rank alignment (LRA). It is also possible to make a transformation of the features of one of the datasets into the subspace of the other of the datasets. LRA is a variation of LRE and can be used to find a common subspace between $v_1, v_2, \ldots, v_p$ and $u_1, u_2, \ldots, u_p$ (such as the features extracted using STFT). One such approach to determining LRA is described in the paper "Aligning Mixed Manifolds" by Boucher, Carey, Mahadevan, and Dyar, the contents of which are incorporated herein by reference.

The approach to determining LRA is as follows. To begin the alignment, X is decomposed using singular value decomposition (SVD), $X=USV^T$. The columns of V and S are partitioned into $V=[V_1 V_2]$ and $S=[S_1 S_2]$ according to the sets $I_1=\{i:s_i>1 \forall s_i \in S\}$ and $I_2=\{i:s_i \leq 1 \forall s_i \in S\}$.
An optimal closed-form solution to the loss function used in LRE, $$\min_R \frac{1}{2}\|X - XR\|_F^2 + \lambda\|R\|_*$$

is $R^{(X)} = V_1(I - S_1^{-2})V_1^T$.

R(X), R(Y) are then calculated independently. In one form the calculations can be performed in parallel to reduce computation time. Block matrices $R, C \in \mathbb{R}^{N \times N}$ are defined as $$R = \begin{bmatrix} R^{(X)} & 0 \\ 0 & R^{(Y)} \end{bmatrix} \text{ and } C = \begin{bmatrix} 0 & C^{(X,Y)} \\ C^{(Y,X)} & 0 \end{bmatrix} \text{ and}$$

$$F \in \mathbb{R}^{N \times d} \text{ as } F = \begin{bmatrix} F^{(X)} \\ F^{(Y)} \end{bmatrix}.$$

The second step of LRA is to calculate the embedding F of X,Y by minimizing the following loss function:

$$\mathcal{Z}(F) = (1-\mu)\|F - RF\|_F^2 + \mu \sum_{i,j=1}^N \|F_i - F_j\|^2 C_{i,j},$$

where $\mu \in [0,1]$ is the hyperparameter that controls the importance of inter-set correspondences. The first term in the equation immediately above accounts for local geometry within each of the datasets, and the second term in the equation immediately above accounts for the correspondence between sets. The loss function can be reduced to a sum of matrix traces as follows:

$$\mathcal{Z}(F) = (1-\mu)tr((F-RF)^T(F-RF)) + \mu\sum_{k=1}^d \sum_{i,j=1}^N \|F_{i,k} - F_{j,k}\|_2^2 W_{i,j}$$

$$= (1-\mu)tr(((I-R)F)^T(I-R)F) + 2\mu\sum_{k=1}^d F_{i,k}^T LF_{j,k}$$

$$= (1-\mu)tr(F^T(I-R)^T(I-R)F) + 2\mu tr(F^T LF).$$

In a similar manner as LLE and LRE, a constraint $F^T F=I$ can be introduced to ensure that the minimization of the loss function is a well-posed problem. Thus:

$$\underset{F:F^T F=I}{\text{argmin}} \mathcal{Z} = \underset{F:F^T F=I}{\text{argmin}} (1-\mu)tr(F^T MF) + 2\mu tr(F^T LF),$$

Where $M=(I-R)^T(I-R)$. To construct a loss function from the equation immediately above, take the right side and introduce the Lagrange multiplier $\Lambda$, $$\mathcal{L}(F, \Lambda) = (1-\mu)tr(F^T MF) + 2\mu tr(F^T LF) + \langle \Lambda, F^T F - I \rangle.$$

To minimize the equation immediately above, find the roots of its partial derivatives:

$$\frac{\partial \mathcal{L}}{\partial F} = 2(1-\mu)MF + 4\mu LF - 2\Lambda F = 0$$

$$\frac{\partial \mathcal{L}}{\partial \Lambda} = F^T F - I = 0.$$

From the above system of equations, we are left with the matrix eigenvalue problem as follows: $((1-\mu)M+2\mu L)F=\Lambda F$ and $F^T F=1$. To solve the minimization problem above, calculate the d smallest non-zero eigenvectors of the following matrix: $(1'\mu)M+2\mu L$.

The eigenproblem can be solved efficiently because the matrix $M+L$ is guaranteed to be symmetric, positive semi-ndefinite (PSD), and sparse. These particular properties arise from $$M + L = \begin{bmatrix} (I-R^{(X)})^2 & 0 \\ 0 & (I-R^{(Y)})^2 \end{bmatrix} + \begin{bmatrix} D^X & -C^{(X,Y)} \\ (-C^{(X,Y)})^T & D^Y \end{bmatrix},$$

where by construction $$D = \begin{bmatrix} D^X & 0 \\ 0 & D^Y \end{bmatrix}$$

is a PSD diagonal matrix and $C^{(X,Y)}$ is a sparse matrix. The following is an algorithm to compute Low Rank Alignment:

Algorithm 1: Low Rank Alignment

Input: data matrices X, Y, embedding dimension d,
    correspondence matrix $C^{(X,Y)}$ and weight $\mu$.
Output: embeddings matrix F.
Step 0: Column normalize X & Y (optional but
recommended if X and Y differ largely in scale).
Step 1: Compute the reconstruction coefficient matrices
$R^{(X)}, R^{(Y)}$:
    $U\,SV^T = \text{SVD}(X)$
    $R^{(X)} = V_1(I - S_1^{-2})V_1^T$
    $\hat{U}\,\hat{S}\hat{V}^T = \text{SVD}(Y)$
    $R^{(Y)} = \hat{V}_1(I - \hat{S}_1^{-2})\hat{V}_1^T$
Step 2: Set F equal to d smallest eigenvectors of
the matrix in $(1 - \mu)M + 2\mu L$ As will be appreciated, once the datasets have been projected onto a common subspace, a comparison can be made between the healthy/baseline training data and the operational data. To set forth just a few non-limiting embodiments to assist in the comparison, classifiers can be used. Classifiers such as but not limited to support vector machines and various distance techniques such as L2-norm can be used.

Figure 5:
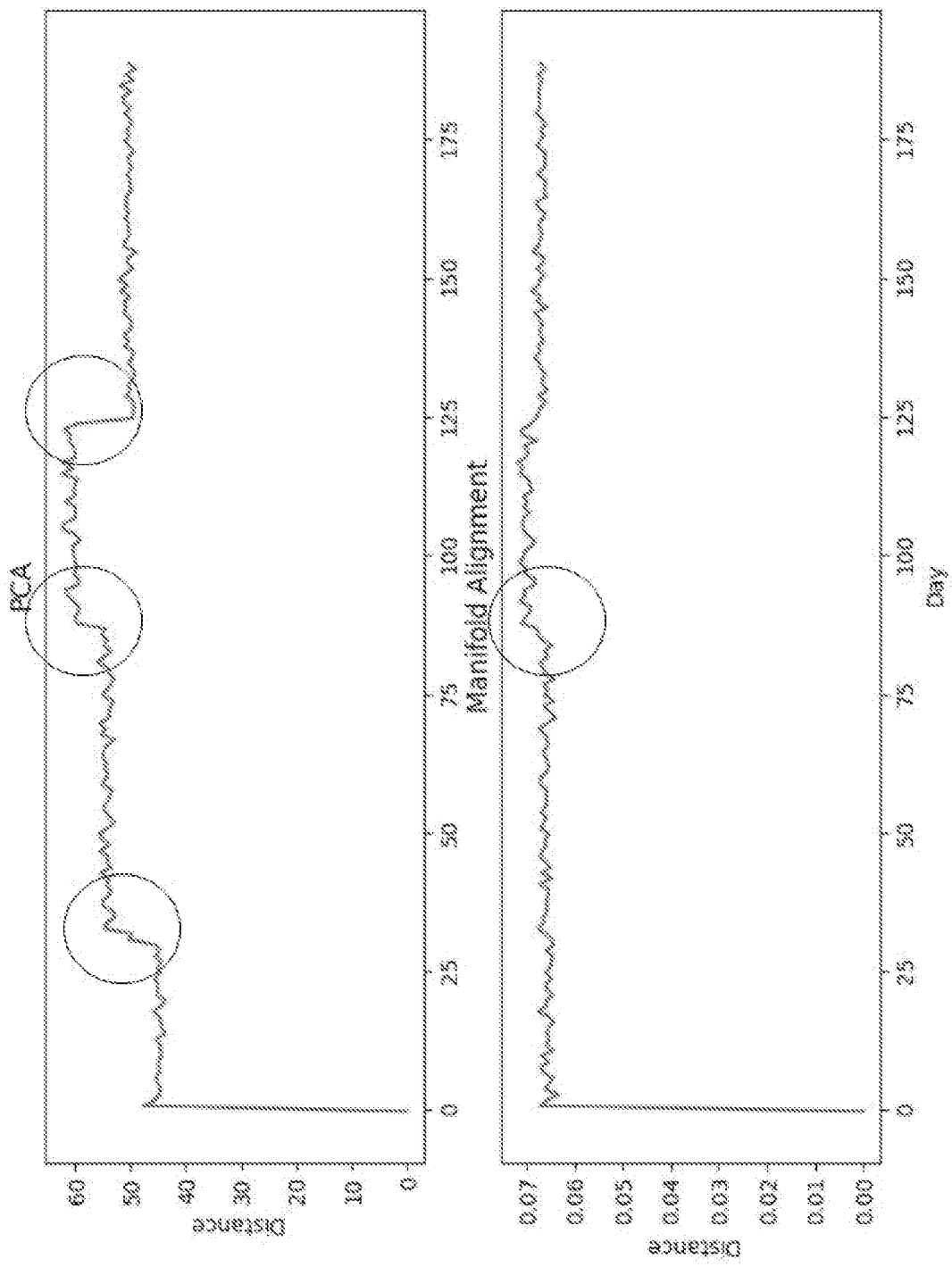
FIG. 5 illustrates a comparison of data using techniques described herein.
Figure 6:
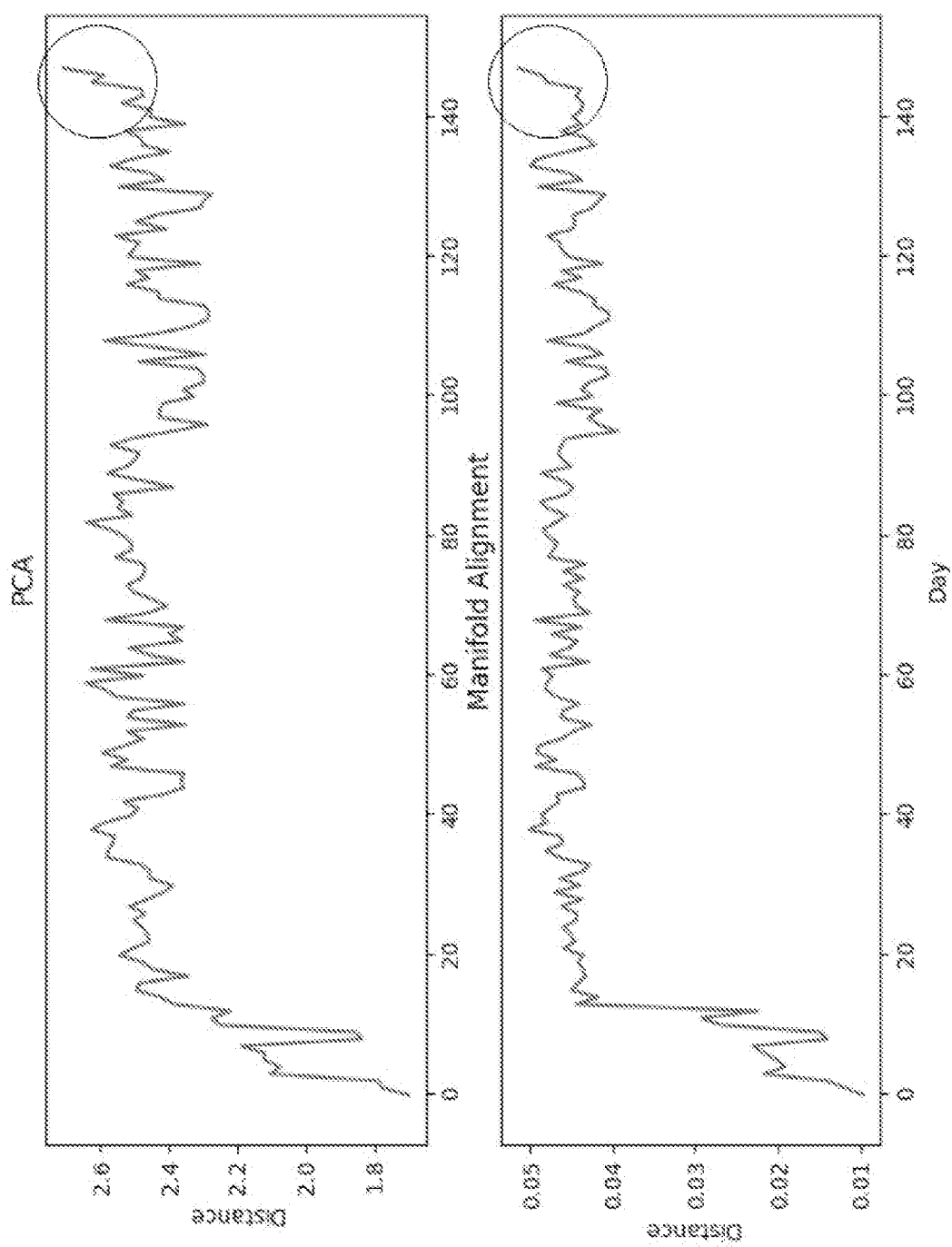
FIG. 6 illustrates a comparison of data using techniques described herein.

FIGS. 5 and 6 illustrate a few results using the techniques described herein. FIG. 5 represents a comparison of data with and without using manifold alignment when there are operation changes only to the robot 50. The top plot of FIG. 5 shows the resulting difference if the operation of the robot is not the same as that used to perform the training, and furthermore represent the resulting difference if the principal component analysis results are not projected onto a common subspace. In the top plot of FIG. 5 are circled the operation changes which are detected as an abnormality when manifold alignment is not used and in which principal component analysis is used on STFT output. Note the large L2 norm of the difference between X and Y. The bottom plot in FIG. 5 shows results using STFT and in which the L2-norm of the difference between the two datasets X and Y is shown after projecting onto the common subspace using manifold alignment. Notice the relatively small scale of the difference between X and Y in the bottom plot of FIG. 5 and the lack of sensitivity to the operation change.

FIG. 6 depicts another experiment, this time one in which no operation changes are used but a robot failure is introduced. The top plot of FIG. 6 is again used to illustrate the L2-norm where datasets are not projected onto a common subspace and in which principal component analysis is used on STFT output. The bottom plot of FIG. 6 illustrates results using STFT and in which the L2-norm of the datasets are projected onto a common subspace using manifold alignment. FIG. 6 illustrates that both techniques can be used to determine the robot failure. Combining the results of both FIGS. 5 and 6, it can be seen that the techniques herein useful to project datasets onto a common subspace are relatively insensitive to changes in robot operations, and are still sensitive to detect robot failures.

Returning now to FIGS. 2 and 3, and with continuing reference to FIG. 1, various other aspects of how data is collected, calculated, shared, and acted on will also be described. The robot 50 and a computing device 55 that implements the subspace projection/alignment techniques described herein (referred to as a diagnostic device) can both be locally located relative to each other, but such configuration is not a requirement. In one form data related to the operation of the robot (e.g. via sensor 62) can be transmitted directly to the diagnostic device, whether located locally or remote from one another. For example, the data can be transmitted via wired and/or wireless techniques which can employ any type of data format (e.g. packet transmission, pulse width modulation, etc). In another alternative and/or additional form data from the sensor 62 can be delivered to a data cloud to be accessed by the diagnostic device. The data transmitted can represent raw data collected by the sensor, but in some embodiments the data can represent measurements that have been preprocessed prior to deliver to the diagnostic device (e.g. conversion from instrumentation counts into a unit of measure, etc) and/or further calculated, processed, etc. The data can be processed by a single computing device 55 to determine health of the robot 50, but in other forms the computing device 55 can be a distributed computing device in which different computations/analysis/steps are performed by various devices spread across the distributed resource. As will be understood, the diagnostic device can be resident with the robot in some forms, and can be remote in others.

Data calculated from the classifier (e.g. the regression calculation (e.g. the L2-norm)) after the datasets have been projected to a common subspace can be shared back to the local area of the robot, it can be used in a database for inspections, and/or it can be stored for later evaluation, among other potential uses. Techniques herein can utilize a criteria useful to identify a robot failure. To set forth just one non-limiting example, an absolute value of the distance calculated by the L2-norm can be used to define the criteria that defines an unhealthy robot. In other forms a relative value calculated by the L2-norm can also be used as the criteria, such as an excursion from a value such as a mean, to set forth just a few non-limiting examples. Other similar or different determinations can be made for other classifiers.

An indication can be set if the data calculated from the classifier exceeds a criteria (e.g. an indication can be set if absolute value/relative value/etc of the distance (e.g. L2-norm) exceeds a criteria). Such an indication can include a textual warning entered into a log, a visible warning on a computer screen, an audible warning in the local area of the robot, a warning light, etc. Such indication can be a generic warning to generally inspect the robot, while other indications can be specific as to replacing or repairing specific robot components. In short, any number of techniques, both passive and active, can be used to automatically flag an unhealthy condition of the robot.

One aspect of the present application includes an apparatus comprising: a robot having a component structured to be subject to relative mechanical movement during operation of the robot, a sensor coupled with the robot configured to detect an operating condition of the component, a diagnostic device configured to receive a measurement from the sensor and including a memory having a training data, the diagnostic device configured to distinguish between a change in health of the robot and change in operation of the robot and having computer based instructions structured to: compute a principal component analysis of the measurement from the sensor to provide an operation data, determine a common subspace between the training data and the operation data, and utilize a classifier trained on the training data and applied on the operation data in the common subspace.

A feature of the present application provides wherein the diagnostic device includes a computer processing device and a computer memory, wherein the memory includes the computer based instructions that when executed by the computer processing device is operative to provide an output signal indicative of the distance between the training data and the operation data in the common subspace, the output signal having greater sensitivity to changes in health of the robot and lesser sensitivity to changes in operation of the robot.

Another feature of the present application provides wherein diagnostic device is further structured to determine the common subspace via unsupervised domain adaptation.

Still another feature of the present application provides wherein diagnostic device is further structured to determine the common subspace via unsupervised domain adaptation.

Yet another feature of the present application provides wherein the unsupervised domain adaptation is performed using manifold alignment.

Still yet another feature of the present application provides wherein the manifold alignment is performed using low rank alignment.

Yet still another feature of the present application provides wherein a measurement of the sensor is correlated with the relative mechanical movement of the robot during an operational movement of the robot, and wherein the diagnostic device is in information communication with a transceiver configured to receive the measurement from the sensor A further feature of the present application provides wherein the distance is computed using an L2-norm measure, and wherein a degraded health condition of the robot can be determined by a comparison of the L2-norm computed distances to a criteria.

Another aspect of the present application provides an apparatus comprising: a robotic diagnostic device which includes at least one input and one output and configured to assist in the determination of a health of a robot having moving mechanical components by distinguishing changes in operation of the robot from a change in health of the robot, the robotic diagnostic device structured to align data features of a training data and data features of an operation data in a common subspace, and utilize a classifier within the common subspace trained on the training data and applied to the operation data, wherein the operation data includes features related to a mechanical movement of the robot which is targeted for health evaluation and the training data includes features related to a reference mechanical movement that the operation data is to be compared against.

A feature of the present application provides wherein the robotic diagnostic device includes a computer processing device and a computer memory, wherein the memory includes instructions that when executed by the computer processing device is operative to provide an output signal indicative of the change in health of the robot, and wherein the robotic diagnostic device is structured to compute the distance such that the distance is responsive to changes in health of the robot and insensitive to changes in operation of the robot.

Another feature of the present application provides wherein the classifier is a support vector machine.

Still another feature of the present application provides wherein the robotic diagnostic device is structured to align features of a training data and features of an operation data in a common subspace using domain adaptation.

Yet another feature of the present application provides wherein the robotic diagnostic device is structured to use unsupervised transfer learning.

Still yet another feature of the present application provides wherein the distance within the common subspace between the training data and the operation data is computed using an L2-norm.

Yet still another feature of the present application further includes a robot coupled with the robotic diagnostic device, the robot having a moveable component and a sensor structured to take data which is correlated with a movement of the moveable component, and wherein the robotic diagnostic device is configured to set an indication when the distance exceeds a health criteria.

Yet another aspect of the present application provides a method comprising: effecting relative movement of a first robotic moveable member relative to a second robotic moveable member, collecting data related to the relative movement, extracting a movement feature of the data so that the movement feature can be compared to a training feature, projecting at least one of the movement feature and the training feature onto a common subspace which includes both the movement feature and the training feature to form an evaluation movement feature and an evaluation training feature, and utilizing a classifier trained on the projected training feature and applied to the projected movement feature.

A feature of the present application further includes comparing the distance to a health criteria and setting an indication if the distance exceeds the health criteria.

Another feature of the present application provides wherein the determining includes computing an L2-norm between the evaluation movement feature and the evaluation training feature.

Still another feature of the present application provides utilizing a classifier includes using a support vector machine.

Yet another feature of the present application provides wherein the projecting includes an unsupervised alignment of the movement feature and the training feature.

Yet still another feature of the present application further includes setting an indication when the distance exceeds a threshold.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An apparatus comprising:
 a robot having a component structured to be subject to relative mechanical movement during operation of the robot;
 a sensor coupled with the robot configured to detect an operating condition of the component;

a diagnostic device configured to receive a measurement from the sensor and including a memory having a training data, the diagnostic device configured to distinguish between a change in health of the robot and change in operation of the robot and having computer based instructions structured to:
- compute a principal component analysis of the measurement from the sensor to provide an operation data;
- determine a common subspace between the training data and the operation data; and
- utilize a classifier trained on the training data and applied on the operation data in the common subspace.

2. The apparatus of claim 1, wherein the diagnostic device includes a computer processing device and a computer memory, wherein the memory includes the computer based instructions that when executed by the computer processing device is operative to provide an output signal indicative of the distance between the training data and the operation data in the common subspace, the output signal having greater sensitivity to changes in health of the robot and lesser sensitivity to changes in operation of the robot.

3. The apparatus of claim 1, wherein diagnostic device is further structured to determine the common subspace via unsupervised domain adaptation.

4. The apparatus of claim 3, wherein the unsupervised domain adaptation is performed using manifold alignment.

5. The apparatus of claim 3, wherein the manifold alignment is performed using low rank alignment.

6. The apparatus of claim 5, wherein a measurement of the sensor is correlated with the relative mechanical movement of the robot during an operational movement of the robot, and wherein the diagnostic device is in information communication with a transceiver configured to receive the measurement from the sensor.

7. The apparatus of claim 5, wherein the distance is computed using an L2-norm measure, and wherein a degraded health condition of the robot can be determined by a comparison of the L2-norm computed distances to a criteria.

8. An apparatus comprising:
a robotic diagnostic device which includes at least one input and one output and configured to assist in the determination of a health of a robot having moving mechanical components by distinguishing changes in operation of the robot from a change in health of the robot, the robotic diagnostic device structured to align data features of a training data and data features of an operation data in a common subspace, and utilize a classifier within the common subspace trained on the training data and applied to the operation data, wherein the operation data includes features related to a mechanical movement of the robot which is targeted for health evaluation and the training data includes features related to a reference mechanical movement that the operation data is to be compared against.

9. The apparatus of claim 8, wherein the robotic diagnostic device includes a computer processing device and a computer memory, wherein the memory includes instructions that when executed by the computer processing device is operative to provide an output signal indicative of the change in health of the robot, and wherein the robotic diagnostic device is structured to compute the distance such that the distance is responsive to changes in health of the robot and insensitive to changes in operation of the robot.

10. The apparatus of claim 8, wherein the classifier is a support vector machine.

11. The apparatus of claim 10, wherein the robotic diagnostic device is structured to align features of a training data and features of an operation data in a common subspace using domain adaptation.

12. The apparatus of claim 8, wherein the robotic diagnostic device is structured to use unsupervised transfer learning.

13. The apparatus of claim 12, wherein the distance within the common subspace between the training data and the operation data is computed using an L2-norm.

14. The apparatus of claim 8, which further includes a robot coupled with the robotic diagnostic device, the robot having a moveable component and a sensor structured to take data which is correlated with a movement of the moveable component, and wherein the robotic diagnostic device is configured to set an indication when the distance exceeds a health criteria.

15. A method comprising:
- effecting relative movement of a first robotic moveable member relative to a second robotic moveable member;
- collecting data related to the relative movement;
- extracting a movement feature of the data so that the movement feature can be compared to a training feature;
- projecting at least one of the movement feature and the training feature onto a common subspace which includes both the movement feature and the training feature to form an evaluation movement feature and an evaluation training feature; and
- utilizing a classifier trained on the projected training feature and applied to the projected movement feature.

16. The method of claim 15, which further includes comparing the distance to a health criteria and setting an indication if the distance exceeds the health criteria.

17. The method of claim 16, wherein the determining includes computing an L2-norm between the evaluation movement feature and the evaluation training feature.

18. The method of claim 17, wherein utilizing a classifier includes using a support vector machine.

19. The method of claim 17, wherein the projecting includes an unsupervised alignment of the movement feature and the training feature.

20. The method of claim 19, which further includes setting an indication when the distance exceeds a threshold.

* * * * *